(12) United States Patent
Naiman et al.

(10) Patent No.: US 6,199,794 B1
(45) Date of Patent: Mar. 13, 2001

(54) MULTI-COLOR, MULTI-PULSE LASER

(76) Inventors: Charles S. Naiman, 160 Lancaster Ter., Brookline, MA (US) 02445; Stuart D. Pompian, 108 Devonshire, Waban, MA (US) 02168

(*) Notice: Subject to any disclaimer, the term of this patent is extended or adjusted under 35 U.S.C. 154(b) by 0 days.

(21) Appl. No.: 05/821,122

(22) Filed: Aug. 22, 1977

Related U.S. Application Data

(62) Division of application No. 05/559,295, filed on Mar. 17, 1975, now Pat. No. 6,078,606.

(51) Int. Cl.[7] ............................. G01S 9/23; G01S 7/28; F41G 7/00
(52) U.S. Cl. .................. 244/3.16; 244/3.13; 250/341.1; 356/152.2; 89/41.06; 89/41.22
(58) Field of Search .................... 244/3.13, 3.16; 250/341, 342, 199, 203, 494; 343/17.2 R, 6; 362/110–112, 259; 356/152; 89/41 SW 331/94.5 R

(56) References Cited

U.S. PATENT DOCUMENTS

| | | | | |
|---|---|---|---|---|
| 2,399,426 | * | 4/1946 | Bradley | 89/41 SW |
| 2,409,462 | * | 10/1946 | Zworykin et al. | 89/41 SW |
| 3,122,737 | * | 2/1964 | Setrin | 343/6.5 R |
| 3,482,184 | * | 12/1969 | Schneider et al. | 331/94.5 C |
| 3,492,600 | * | 1/1970 | Zitter | 332/7.51 |
| 3,548,212 | * | 12/1970 | Whetter | 250/203 |
| 3,698,248 | * | 10/1972 | Cunningham | 356/152 |
| 3,766,393 | * | 10/1973 | Herzog et al. | 250/199 |
| 3,774,121 | * | 11/1973 | Ashkin et al. | 331/94.5 C |
| 3,787,853 | * | 1/1974 | Brookner | 343/17.2 R |
| 3,818,372 | * | 6/1974 | Wuerker et al. | 331/94.5 M |
| 3,860,888 | * | 1/1975 | Stephens | 331/94.5 C |
| 3,866,224 | * | 2/1975 | Porter et al. | 343/17.2 R |
| 3,889,261 | * | 6/1975 | Sirven | 343/17.2 R |
| 3,902,137 | * | 8/1975 | Hughes | 331/94.5 C |
| 4,047,678 | * | 9/1977 | Miller et al. | 244/3.16 |

FOREIGN PATENT DOCUMENTS

1025545 * 5/1975 (CA) ................................ 331/94.5 R

* cited by examiner

Primary Examiner—Nelson Moskowitz
(74) Attorney, Agent, or Firm—David W. Gomes

(57) ABSTRACT

A multi-color, multi-pulse laser target designator is disclosed in which the target is illuminated with pulses of preselected colors and interpulse spacings so as to uniquely identify the target. Inter-pulse spacing may be varied down to an arbitarily small spacing by virtue of the use of pulses of differing colors, thereby increasing countermeasure resistance due to the difficulty of a target detecting and duplicating inter-pulse spacing. Pulse elongation is provided in one embodiment to provide prolonged illumination of the target so as to permit increased homing accuracy for optically guided weapons.

7 Claims, 6 Drawing Sheets

CASE A

CASE B

MULTI-COLOR, MULTI-PULSE LASER

This is a division, of application Ser. No. 05/559,295, filed Mar. 17, 1975, now U.S. Pat. No. 6,078,606.

A multi-color, multi-pulse laser operating at a number of wavelengths is provided with a like number of cavities to produce a like number of output pulses from a single pumping pulse. The spacing between the pulses is easily controlled by controlling the timing of Q-switches, each in a different cavity, so that information is imparted by the pulse spacing. In a two color embodiment, a beam splitting device is positioned along the longitudinal axis of the laser medium to produce two beams which are directed into different cavity resonators, each tuned to a different wavelength. Reflecting surfaces positioned at the end of each cavity redirect each beam back to the beam splitting device where the beams are spatially recombined and subsequently two pulses, one of one color and the other of the second color, are sequentially coupled out of the laser system. The colors may be sufficiently close in wavelength such that detection does not discriminate against the two colors, and a double pulse output is obtained at the detector. In this manner, the laser system produces two output pulses from a single laser medium and a single pumping pulse. The pulse width of each of the pulses may also be controlled by pulse stretching means in one or more of the optical paths.

FIELD OF THE INVENTION

This invention relates to laser systems, and more particularly to a laser system for providing a multiple light-pulse output in which interpulse spacing and/or pulse width are independently controlled for laser target designation.

BACKGROUND OF THE INVENTION

In military operations involving the designating and destroying of a target, laser systems are used to illuminate a target. This light is reradiated in all directions by the target and is used by a missile for homing in on the target. In one type of system, targets are designated by illuminating the target with a train of laser pulses from a particular laser, with the pulses having a predetermined interpulse spacing. A typical method of countermeasuring this laser target illumination is by detecting the pulses at the target, determining their pulse repetition frequency (PRF) or pulse interval modulation (PIM) and producing like laser pulses which are aimed at a reflective object removed from the target.

In an effort to prevent the countermeasuring of the illuminating laser, the subject invention involves a new type laser which is modulated to produce pulse pairs or doublets which cannot be easily detected and reproduced by the target. In order to be effective the interpulse spacing between the pulses of the doublet must be small and the spacing must be very accurate since it is extremely difficult to detect the fact that the laser radiation is pulsed when pulse spacings are very small. Moreover, even if the double laser pulses are detected, it is extremely difficult to generate like laser pulses because it is difficult to duplicate exactly the small interpulse spacings. Therefore the combatants who have apparatus for producing double pulse laser beams with extremely short accurately controlled interpulse spacings will have a virtually uncountermeasurable system.

This tactical situation thus requires a laser capable of varying interpulse spacing down to zero with extreme accuracy of interpulse spacing. Moreover, this tactical situation requires that pulse spacing be easily varied so that the illuminating laser can quickly change its output waveform to avoid detection.

Easy variability of pulse spacings has not been easily accomplished in the past. Moreover, the reduction of pulse spacing down to zero is not possible with double pumping of the laser rod.

In the prior art, techniques for obtaining multiple output pulses can be divided into two classes; (1) systems in which the separation between pulses is directly proportional to the time required to restore the population inversion in the lasing medium and (2) those system which are independent of the restoration time of the lasing medium. Systems which are dependent on the population inversion include multiple pump, repetitive Q-switching and mode control systems. An example of the multiple pump system is illustrated in U.S. Pat. No. 3,783,403. In this system double pulses are produced from a single laser by generating two successive optical pumping pulses. However, pulse spacing cannot be decreased to zero in this system.

An example of a laser system which is independent of the restoration time is described in an article by M. J. Landry, entitled "Variably Spaced Giant Pulses for Multiple Laser Cavities In a Single Lasing Medium", *Applied Physics Letter*, Vol. 18, pages 494–496. In this method, a prism is used to effectively split the laser rod longitudinally into two rods. This requires a rod of relatively large cross section. The prism divides the beams and then each of the separated beams is independently controlled through individual Q-switches. However, in the Landry system only one wavelength or color is utilized and the stress birefringent effect to be described hereinafter is not used.

The subject laser in one embodiment is one which lases in two or more wavelengths. The colors result from radiative transitions which can occur in two different ways: (1) from a single high energy level to multiple different lower energy levels or (2) from multiple different upper energy levels to a single low energy level. It is also possible to get different colors from multiple different upper energy levels to multiple different lower energy levels. The situation will be discussed later in connection with Er:YLF lasers. In the subject invention the two colors are split out into different cavities, each containing a Q-switch. The Q-switches are activated sequentially with a predetermined delay such that light of one color is coupled back through the laser rod to produce a first pulse, while the activation of the second Q-switch couples light of the other color back through the laser rod to produce a second pulse. Pulse spacing is controlled by the delay in activation of the second Q-switch. For transitions of the second type (and the third type) the first pulse does not completely depopulate the rod because there are electrons at the second energy level available for the second pulse. This sytem is useable with ruby rods and some Nd:YLF rods.

When, however, there are two transitions both starting from the same excited level, stress birefringence induced by the pumping of the rod may play a major part in permitting the production of two pulses. When two transitions start from the same excited level, it is possible that the production of the first pulse will completely depopulate the laser rod making two pulse production impossible. In some instances this can be prevented by very rapid Q-switching. However, stress birefringence provides simpler, more effective way of preventing complete depopulation during the production of the first pulse.

Stress birefringence occurs because some of the energy pumped into the laser rod is converted to heat which changes the characteristics of the rod such that two beams are produced each having a different polarization. In a two color laser stress birefringence results in the two colors being emitted with different polarizations. When the beams are separated into two differently polarized beams by a polarizing beam splitter then one polarized beam only partially depopulates the rod for the first pulse, thereby leaving enough of a population inversion for the formation of the second pulse. The Q-switching of the second cavity then can couple the remaining energy out of the rod to produce the second pulse.

It is a finding of the present invention that stress birefringence when the laser is pumped produces beams having orthogonal polarizations. The beams are separated according to polarization and each are Q-switched at different times to produce multiple pulses. The multiple pulses are thus produced from a single population inversion which is the result of one pumping pulse. Each polarity beam selectively depopulates the laser host material so that only a portion of the rod population is depopulated with each polarization to enable the production of two pulses when the Q-switching turn on is not rapid enough.

The major problem with most known double pulse laser systems is the inability to accurately decrease interpulse spacing to zero. While, as explained later, very small pulse spacings may not be necessary in such fields as double exposure holography, the ability to achieve very small pulse spacings is extremely important in the fields of communications for increased bandwidth and in military target designation, where laser beams having extremely small pulse spacings are required.

With respect to applications of multiple pulse lasers, as stated in the above mentioned patent the double pulse out put may be used in double exposure holography in which two holograms are formed in rapid succession to detect any small disturbance occuring in the time between the two pulses. Double exposure holography is described in U.S. Pat. No. 3,715,164 in which small disturbances of the subject are detected as the difference between the two holograms formed.

In the case of double exposure holography the two pulses are responsible for forming two successive holograms, with the pulse spacing providing the time internal between the two exposures. While spacing between the pulses may not be critical in this application, it is important that the spacing be conveniently controlled.

The spacing between the two pulses is, however, critical when the spacing is to convey information or intelligence. Intelligence can be conveyed by the laser beam in the form of the coding of pulses in a pulse train produced when the laser is turned on and off in a predetermined manner. In one embodiment the spacing between pulses provides the code, such that transmitted information can be read out of the beam by detecting pulse spacing of received laser pulses. For instance, an aircraft can convey its altitude to a ground station over a laser-powered optical link, with the pulse spacing indicating altitude or any other desired parameter.

Moreover, in laser optical communications, when pulse spacing is used as the modulation parameter, it is important that pulse spacing be easily controlled and varied down to zero for the packing of more information into a given time interval.

Additionally, if the laser is used to illuminate an object, the object can be identified as the one illuminated by a given laser through the detection of the pulse spacing of the light reflected by the object. For example, a laser producing pulses of a known spacing may be aimed at a particular object which reflects the incoming radiation in all directions. If radiation from an object has this known pulse spacing then it is known that this object is the one at which the laser is aimed. Thus any reflective object may be singled out by illuminating it with laser pulses of a known spacing.

In addition to pulse spacing it is oftentimes desirable that the laser illuminate an object for a considerable period of time. If one of the multiple pulses is elongated then, in addition to pulse spacing, a multiple pulse laser can be used for illumination as well as the transfer of information.

These two aspects, e.g. minimum pulse spacing and pulse elongation, are important when in a military environment a target is to be both illuminated by a laser and identified by pulse spacing. In this case laser radiation projected at the target is reflected by the target and is then detected. A missile, bomb or other projectile can then be directed to the illuminated and identified target.

Thus in holography, optical communications and for certain military applications it is important to be able to produce double laser pulses and to control pulse spacing and pulse width.

SUMMARY OF THE INVENTION

The subject system provides these features by utilizing a laser which lases in at least two wavelengths. For purposes of discussion, only a two colored laser will be described, it being understood that the number of pulses produced depends on the number of wavelengths at which the laser material lases. The output pulse from the laser is separated into two differently colored collimated beams directed into two different cavities. Each of the two cavities is provided with a separate Q-switch. The actuation of the Q-switches is separated by a time interval or delay correlated to the information to be transmitted, such that pulses from one cavity are reflected back through the beam splitter and out the laser prior to pulses from the other cavity. The time interval between the pulses is determined by the delay between actuation of the Q-switches and this can be very accurately controlled by control of the Q-switches and can be made infinitely small. Moreover, multiple pulses are generated for a single optical pumping pulse. Pulse stretching is accomplished by the interposition of a non-linear absorbing element in the cavity which produces the pulse to be elongated.

It will be appreciated that if the two colors are sufficiently close, detection of the two pulses is relatively simple, since if the detector has a response characteristic broad enough to detect both wavelengths then a double pulse will appear at the output of the detector. Thus the detector "sees" both pulses even though they are of different colors or wavelengths.

Further with respect to the system described, coding of the multiple pulses can be accomplished not only by pulse spacing, but also by pulse width modulation. The pulse width of a laser pulse can be varied in accordance with intelligence to be transmitted on the laser beam by providing the above mentioned non-linear element and by varying the input energy to the laser medium in accordance with the intelligence to be transmitted. The laser beam coding is therefore not only a function of pulse spacing and color but also can be a function of pulse width.

Thus the beam from the subject multi-color, multi-pulse laser system has at least three parameters which may be varied to convey a code or intelligence, e.g. color, pulse spacing and pulse width. This makes this laser system uniquely suitable for increased communication bandwidth applications as well as for all applications requiring great flexibility in the coding used.

As to the advantages of the subject laser system in addition to pulse spacing and pulse width control there is an added advantage with respect to the power requirements for the laser. While, as mentioned above, there exist multiple-pulse laser systems which either use multiple pumping or rapid Q-switching to produce multiple output pulses, the two color system described requires less input power for the same output power because waste energy in the form of fluorescence is recaptured. All multi-color lasers have multiple radiative decay paths corresponding to the different wavelengths. In the prior art it is common to tune the laser for one transition, with the result that radiation from other possible transitions meanwhile undergoes fluorescence, e.g. non-coherent light, and this energy is lost.

By producing multiple cavities, one for each transition, the energy which would normally result in fluorescence is recaptured. Thus when the subject system is used for producing multiple pulses, all of the laser input energy is utilized.

Moreover, in the case where a polarizing element is used to permit double pulse formation there is an added advantage. If as in the above mentioned Landry laser system a prism type beam splitting element is used, polarized light induced by birefringence is lost, because it is diverted off-axis by the polarizing optics. However, in the subject system, the light which normally would be diverted off-axis is instead diverted to a second cavity and is thus not lost, but is rather amplified in the cavity and directed out along the output axis of the laser. Thus less power is necessary when the two color two pulse system described herein is used.

It will be appreciated that in general if the pulses are overlapping, this invention can be considered one involving the generation of a multi-color coherent light beam. Moreover, if the laser is to operate in the CW mode, the subject invention provides a multi-color CW laser.

It is therefore an object of this invention to provide an improved double pulse laser system in which pulse spacing is easily controlled.

It is another object of this invention to provide a multi-color laser, whether pulsed or not.

It is a further object of this invention to provide a multiple pulse laser, with the number of cavities and pulses depending on the number of colored beam components generated as a result of a single optical pumping pulse.

It is still further object of this invention to provide an improved method of producing multiple monochromatic light pulses in which each pulse is of a different color and in which the spacing of each pulse from an adjacent pulse is readily controlled.

It is yet another object of this invention to provide an improved laser system in which different colored light components from a laser medium are channeled into different cavities and in which each cavity is provided with a Q-switching device whose switching function is in timed relationship with the Q-switching devices in other cavities thereby to produce a multiple pulse output from the laser.

It is still a further object of this invention to provide a method of, and apparatus for, producing multiple monochromic pulses in which one of the pulses is elongated for illuminating an object.

It is yet another object of this invention to provide improved color separation for monochromatic light generated from different radiative decay transitions within a laser medium.

It is still further object of this invention to provide a laser system in which intelligence is communicated by varying the width of the laser pulse in accordance with the intelligence to be communicated.

It is yet another object of this invention to provide a laser system and modulation which permits information to be read out as a function of color, pulse spacing or pulse width or any combination of same.

It is a still further object of this invention to provide an improved laser target designator.

These and other objects of this invention will be better understood in connection with the following description in view of the appended drawings in which:

DESCRIPTION OF PREFERRED EMBODIMENTS

Figure 1:
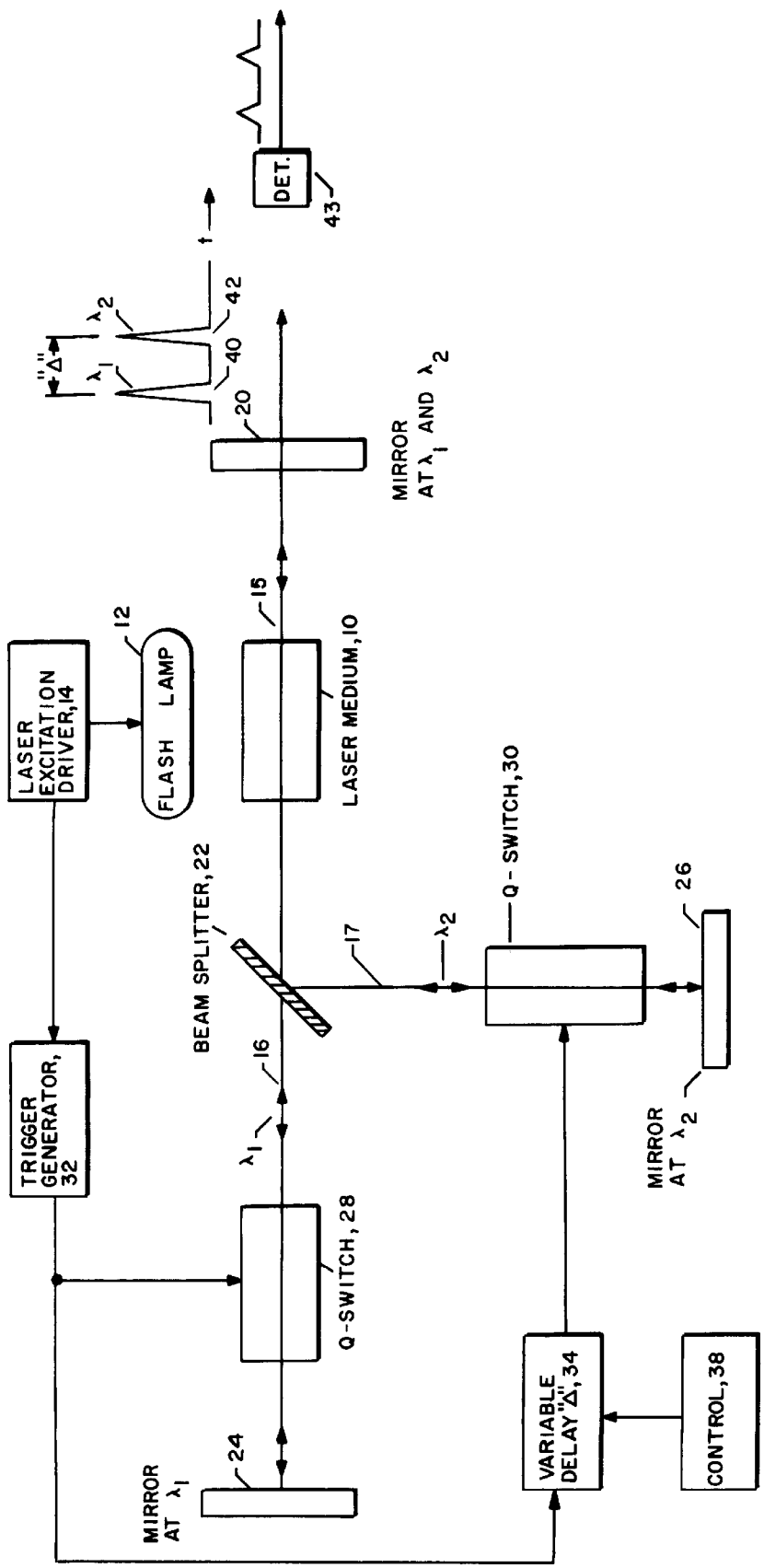
FIG. 1 is a block diagram illustrating one embodiment of the multi-pulse multi-color laser system.
Figure 2A:
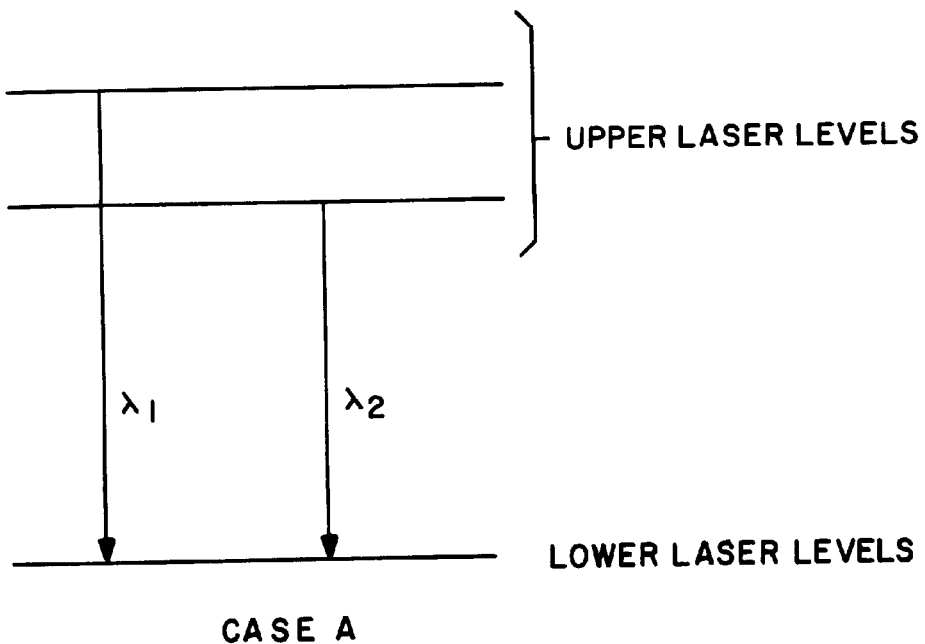
FIGS. 2a and 2b are energy level diagrams illustrating possible radiative decay paths for two color lasers.

Referring now to FIG. 1, one embodiment of the subject laser system is illustrated in which laser transitions occur from different energy levels to a single lower energy level as illustrated in FIG. 2a. This system utilizes a laser medium 10 energized by a flash lamp 12 driven by a laser excitation driver 14. Two partially overlapping and orthogonally oriented laser cavities are defined by optical paths 15, 16 and 17. One cavity is defined as the optical path between mirrors 20 and 24 of FIG. 1, while a second cavity is defined by the optical path between mirrors 20 and 26. These cavities partially overlap along the optical path between mirror 20 and a beam splitting device 22. Each cavity is tuned to a different wavelength (color) of the radiation from the laser medium such that one cavity is tuned to a wavelength $\lambda_1$, and the other tuned to a wavelength $\lambda_2$. Optical path 15 defines the major optical axis of the system along which laser radiation is projected. At one end of optical axis 15 mirror 20 is partially reflective at wavelengths $\lambda_1$ and $\lambda_2$. Beam splitting device 22 is situated at an angle of 45° and is coated to transmit and reflect light at the $\lambda_1$ and $\lambda_2$ wavelengths respectively.

With respect to the present invention a laser cavity is one which is bounded by reflective means at each end, with the reflective means oriented to establish an optical path between them, the spacing between the reflective means being set so as to establish standing waves of electromagnetic energy at one particular wavelength in the cavity. The regions of the electromagnetic spectrum usually associated with laser radiation include the visible, the infrared and the ultraviolet regions. However, coherent radiation generated by stimulating emission from a laser rod or other medium can be achieved at microwave frequencies with a maser utilizing a lasing medium of ruby and also in the X-ray region of the spectrum with a UV laser and multiple doubling steps. While it is convenient in describing the subject laser in terms of "light" amplification, it will be understood that the term "light" as used herein includes all of the above regions of the electromagnetic spectrum.

Initially the beam from the laser medium carries light of both wavelengths or colors. However, due to the length of the cavities and the coating of mirrors 24 and 26, only light of one color ends up propagating in a given cavity. Thus a beam of wavelength $\lambda_1$ propagates along optical path 16 and a beam having a wavelength $\lambda_2$ propagates along optical path 17.

Mirror 24 has a coating which permits the mirror to be reflective at wavelength $\lambda_1$ and is positioned at the end of optical path 16 and mirror 26, reflective at wavelength $\lambda_2$ is positions at the end of optical path 17. Interposed in optical path 16 is a Q-switch device 30 and interposed in optical path 17 is the second Q-switching device 30. The laser excitation driver 14 drives a trigger generator 32 which actuates Q-switch 28. Alternatively, the driver and trigger may be the same unit. The output from trigger generator 32 is applied to a variable delay unit 34 which delays the trigger pulse from the trigger generator 32 by an amount $\Delta$. The amount, $\Delta$, by which the trigger pulse is delayed is controlled by a control unit 38. The output of the variable delay unit 34 is applied to Q-switch 30. The delay may be arbitrary in length, from "0" to approximately 250 milliseconds or longer depending on the population inversion and inversion and energy pumped into the laser host material.

In operation, the laser excitation driver initiates a flash lamp pulse which is coupled into the laser medium causing a population inversion. Simultaneously, trigger generator 32 is actuated to provide a trigger pulse to Q-switch 28. Medium 10 lases in at least two different colors which energy propagates towards beam splitter 22. At this point, the beam is directed into different cavity portions. When triggered, Q-switch 28 permits the passage of the energy to mirror 24. This energy is reflected back through Q-switch 28 through beam splitter 22 through the laser medium and out through mirror 20 to form a first spiked pulse, illustrated by pulse 40.

After a predetermined time delay, $\Delta$, the trigger pulse from trigger generator 32 is applied to Q-switch 30 which permits light of the second color to propagate down this section of the laser cavity. Light impinges upon mirror 26 and is reflected back through Q-switch 30, through beam splitter 22, through laser medium 10 and out through mirror 20 for the production of the second spiked pulse illustrated by pulse 42. These pulses may be detected by a conventional detector 43 responsive to light at both $\lambda_1$ and $\lambda_2$ to produce the double pulse output shown.

Figure 2B:
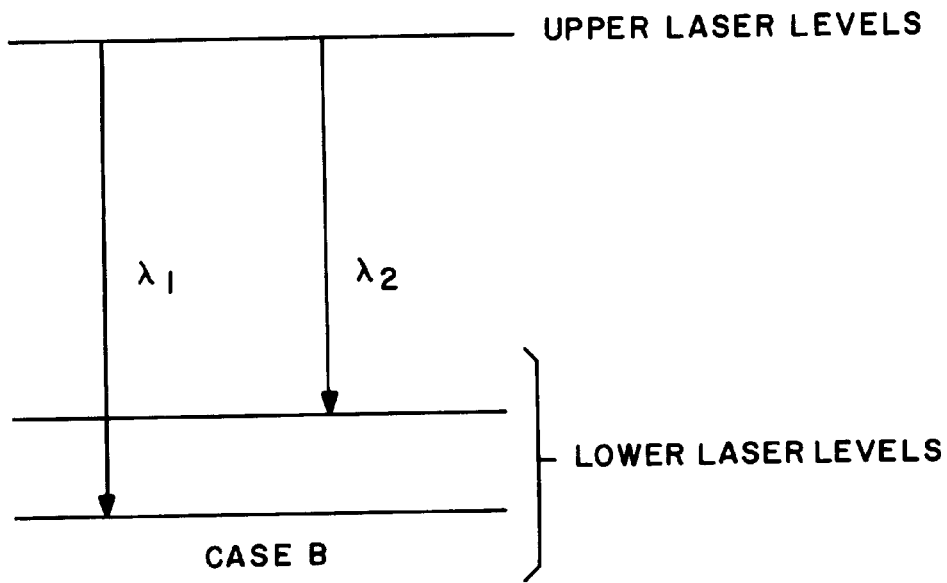

This system may also be used for lasers having the FIG. 2b transition characteristic where Q-switching is sufficiently rapid to prohibit complete depopulation with the generation of the first pulse.

The laser system thus described is defined by two cavities with the first cavity being defined as the optical path between mirror 20 and mirror 24 and with the second optical cavity being defined by the path between mirror 20 and mirror 26.

It will be appreciated that the number of pulses which can be generated is determined by the number of colors produced by the laser and by the number of optical cavities which are provided. Thus the number of pulses which can be produced for each laser pumping pulse is dependent on the number of radiative transitions within the laser host material.

Figure 3:
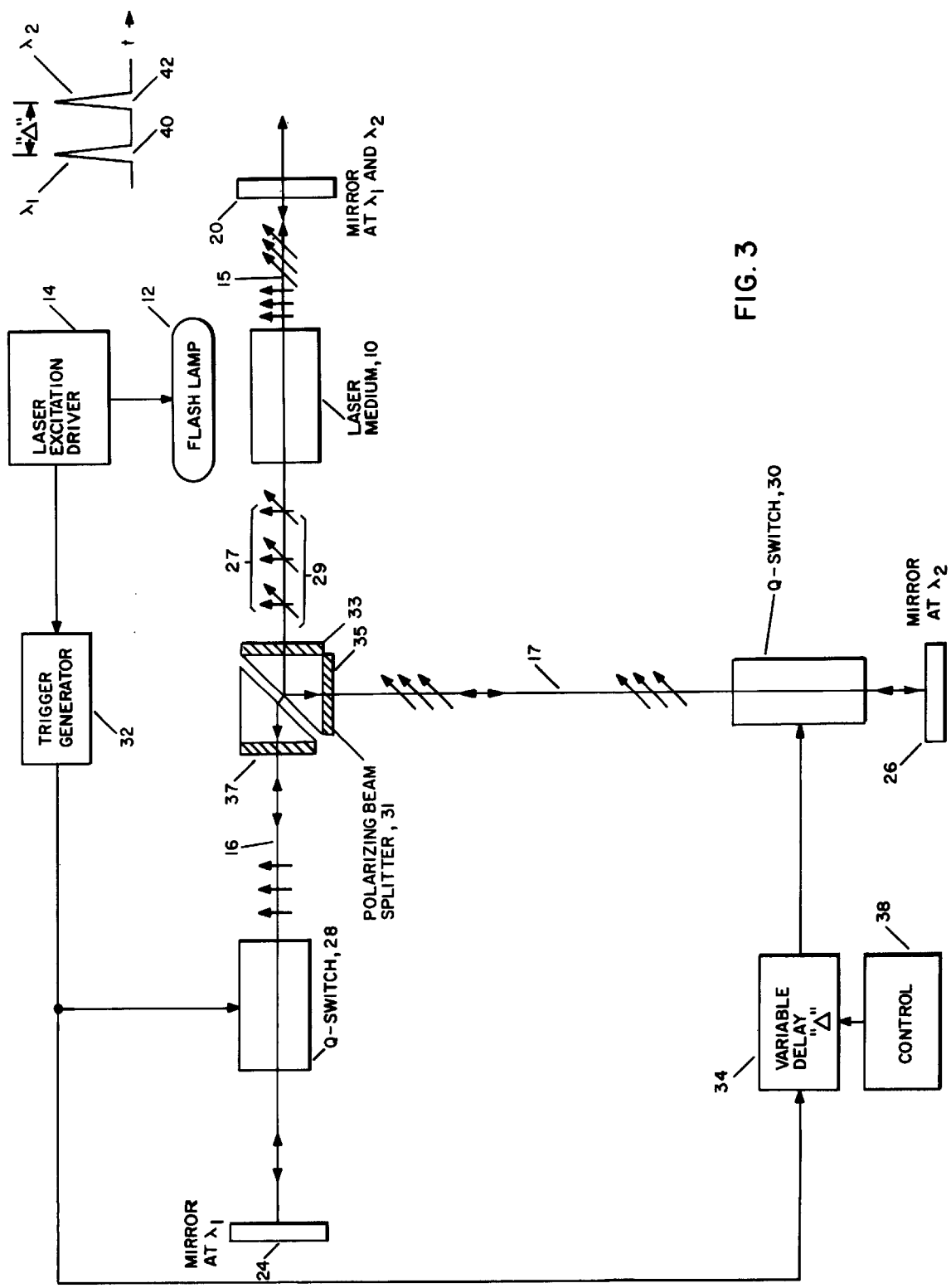
FIG. 3 is a block diagram of the subject laser system in which birefringently induced polarization is utilized in multiple pulse generations.

Referring to FIG. 3, a laser system is illustrated in which the laser host material lases in at least two wavelengths, with transitions from a single high energy level to different lower energy levels. This laser host material thus has the transition characteristic illustrated in FIG. 2b.

As mentioned hereinbefore, the use of a conventional beam splitting device to direct the output from the laser material into the two laser cavities may result in the generation of only the pulse when the Q-switching is not sufficiently rapid. The reason for this is that all energy stored in the laser host material may be coupled out of the system with the generation of the first pulse.

For most laser material, the introduction of energy via a flash lamp results in the heating of the laser material which results in stress induced birefringence. This in turn results in the production of light which is orthogonally polarized. In the case of two transitions it has been found that light of one color will be polarized in one direction as indicated by arrows 27, while light of the other color will be polarized in an orthogonal direction as indicated by arrows 29.

Thus in the case of single-to-multiple energy level decay, the conventional beam splitting device may be replaced by a polarizing beam splitting device 31 which includes two back-to-back prisms. The prisms may preferably be made of calcite which, as is the case for most transparent material, has an index of refraction which not only varies as a function of wavelength but also as a function of polarization direction.

Where the difference in the wavelengths of the light produced by a laser rod is great, color separation can be accomplished by the difference in refractive index for the two wavelengths. Thus light having one color and polarization will be reflected away from the optical axis while light of the other color and polarization will be refracted and directed along the same optical path. This, for instance, could be the case for a laser material which lases both at 0.85 microns and 1.73 microns. Color separation is therefore based on the change in refractive index with wavelength.

However, for a laser rod which lases at 1.06 and 1.31 microns, the change in the index of refraction is very slight and in most cases prevents complete color separation by refractive techniques alone. On the other hand, the change in refractive index for beams which are orthogonally polarized is great which permits separation of the two colored components on account of their polarization alone. Taking as an example the system of FIG. 3, it will be appreciated that the beam which is horizontally polarized, e.g. as shown by arrows 29, enters the beam splitter 31 at an angle which exceeds Brewster's angle for this polarization and is therefore internally reflected. This occurs because as far as a beam having horizontal polarization light is concerned, the refractive index of the material is much higher than that which is "seen" by vertically polarized light. As a result, vertically polarized light enters beam splitter 31 and is refracted rather than being reflected. Thus, the horizontally polarized beam effectively enters the prism at less than Brewster's angle and is reflected while the vertically polarized beam is refracted. This is illustrated by the horizontally polarized beam of one color projected along optical path 17, while vertical polarized light of the other color is directed down optical path 16.

Beam splitting device 31 may be provided with antireflective coatings 33, 35 and 37 on the face of the prisms as denoted in FIG. 3, for the purpose of eliminating surface reflections. Assuming that the wavelength of light projected along optical path 16 is 1.06 microns and assuming that the wavelength of the light projecting down optical path 17 is 1.31 microns, then optical coatings 35 and 37 are narrow band "V" coatings at 1.31 microns and 1.06 microns, respectively. Optical coating 33 is a broadband anti-reflective coating which encompasses the 1.06 and 1.31 wavelengths.

It will be appreciated that as before mirrors 24 and 26 are provided with reflective coatings at $\lambda_1$ and $\lambda_2$ respectively. Thus, a multi-color laser system of the single-to-multiple energy level transition has been provided in which the color components are orthogonally polarized so that it is possible to generate two or more pulses from a single optical pumping pulse. The system of FIG. 3 may also be utilized for lasers having the FIG. 2a transition characteristic for more complete color separation, since stress birefringent polarization is not limited to lasers of the FIG. 2b transition configuration.

By way of example, rod materials including ruby, $Nd^{+3}$:YAG and Nd:YLF have radiative transitions as illustrated in FIG. 2b. Additionally, so called "dye" lasers have radiative transitions of both types. The double pulse laser systems illustrated in FIGS. 1 and 3 are set forth by way of example only, and no limitation to any two colors or any two color lasers is intended thereby.

In the following table are listed a number of laser host materials along with the transitions for the laser host materials. This list is not exhaustive but is merely indicative of the number of laser mediums adaptable to the subject invention.

| MATERIAL | WAVELENGTHS | DIAGRAM |
| --- | --- | --- |
| $Cr^{+3}$:$Al_2O_3$(Ruby) | 0.6943 ($R_1$ line) 0.6929 ($R_2$ line) | 6929Å 6943Å |
| $Nd^{+3}$:$LiYF_4$(YLF) | 1.0530 1.0471 | 1.0471 1.0530 |
| $Nd^3$:$Y_3Al_5O_{12}$(YAG) | 1.06 1.32 0.946 | 1.32 1.02 0.946 |
| $Er^3$:$LiYF_4$(YLF) | 1.73 1.2 0.85 2.8 1.6 | 1.73 P.2 2.8 0.85 1.6 |

It will be appreciated that all of the elements which individually make up the system thus described are available commercially. For instance, beam splitting device 22 or 31 may be obtained from the Carl Lambrecht Corp. of Chicago, Ill. with any of the conventional narrow band anti-reflective "V" coatings. The trigger may be obtained as model TR-179 from EG&G of Boston, Mass. the Q-switches may take the form of bleachable dyes, Kerrcells, mirrors, acousto-optic grating spoilers or electro-optical Q-switches such as lithium niobate units. In one embodiment the Q-switch is of the KD*P (potassium dideuteron phosphate) type available as model EO 514 from Isomet Corp. of Pallisades Park, N.J. In these Q-switches an applied relative field changes the polarization of the device to gate the light. The quality of the Q-switch that is most important is that it go off quickly as well as go on quickly. Several of the Kappa-Scientific Corp. of Santa Barbara, Calif. Q-switches have the appropriate switching parameters (of the KERRMAN 550 series). Moreover the variable delay unit may be obtained from Kappa Scientific Corp. as model KD1000 or KD2000.

With respect to the range of pulse spacings available it will be appreciated that the pulses can be made to overlap by simultaneous triggering of Q-switches. The length of the interpulse spacing depends on the energy coupled into the laser host material and by the decay time of the excited electrons after the optical pumping pulse has been delivered. At the present there are statistically very few excited electrons left after 230 microseconds and this may be the practical upper limit to the pulse spacing at least for the common host materials.

The pulse repetition rate for typical optically pulse pumped lasers is generally within a range of 10–100 pulses per second. Thus 10–100 double, triple, etc. pulses per second can be generated by the subject system. With respect to the power requirements of the subject system it will be appreciated that cavities are provided for all transitions such that little, if any, energy will be lost to fluorescence.

Figure 4:
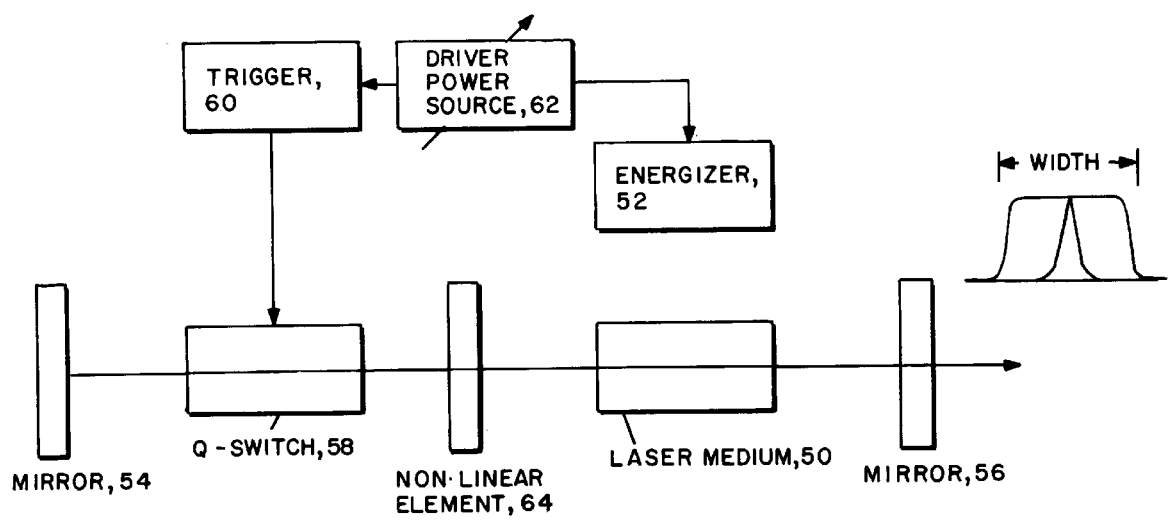
FIG. 4 is a block diagram illustrating a laser system in which a non-linear element is interposed between the laser medium and a Q-switch in the laser cavity, illustrating the change in pulse width with a change in energy delivered to the laser medium.

Referring now to FIG. 4, a typical laser system is illustrated comprising a laser medium 50, energizing means 52, reflecting and partially reflecting mirrors 54 and 56, a Q-switching device 58, an associated trigger 60, a variable power source 62 connected to the energizing means and a non-linear element 64 situated in the optical cavity along the optical axis thereof. This non-linear element is described in U.S. Pat. No. 3,829,791 entitled "Variable Pulse Laser" issued to Jack Schwartz on Aug. 13, 1974 and assigned to the assignee hereof. The patent is incorporated herein by reference. The element in one embodiment is CdS or CdSe and acts as an energy absorber and reradiator which in effect stretches the pulses in accordance with the input energy coupled into the laser host material.

Figure 5:
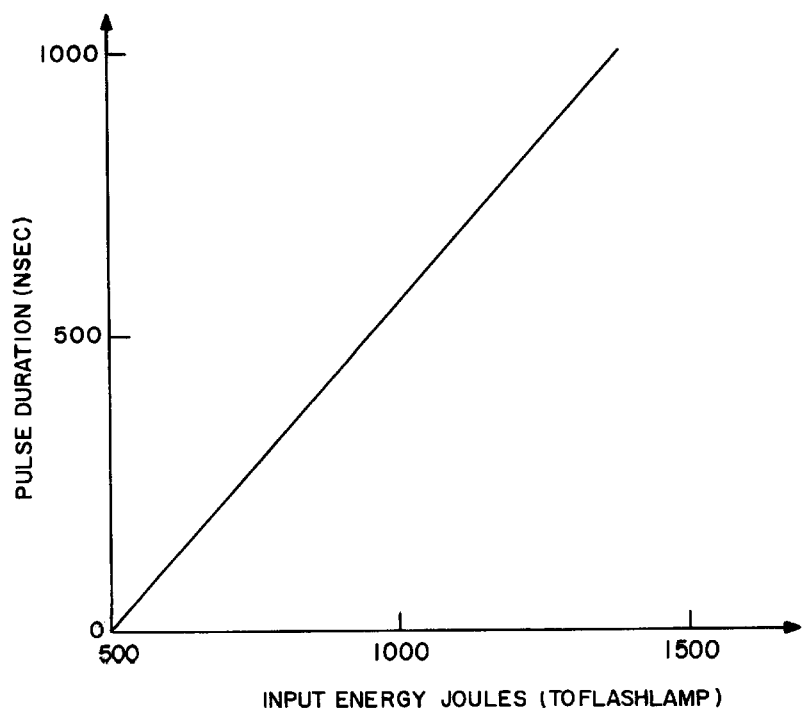
FIG. 5 is a graph illustrating the relationship between input power and pulse width for the system illustrated in FIG. 4.

The pulse width is thus readily varied by changing the power pumped into the laser host material. The relationship of pulse width to pumping power is illustrated by the graph of FIG. 5.

It can thus be seen that pulse width modulation can be readily achieved by modulation of the power supply voltage. Moreover, as mentioned hereinbefore, by stretching the output pulse a longer period of illumination is achieved.

Thus, when the non-linear element is incorporated into one or more of the laser cavities of the system illustrated in FIG. 1, three parameters may be utilized to convey information, e.g. color pulse spacing and pulse width. Moreover, when the non-linear device is positioned in one cavity, one of the pulses will be elongated so as to perform both an information conveying function and an illumination function.

Figure 6:
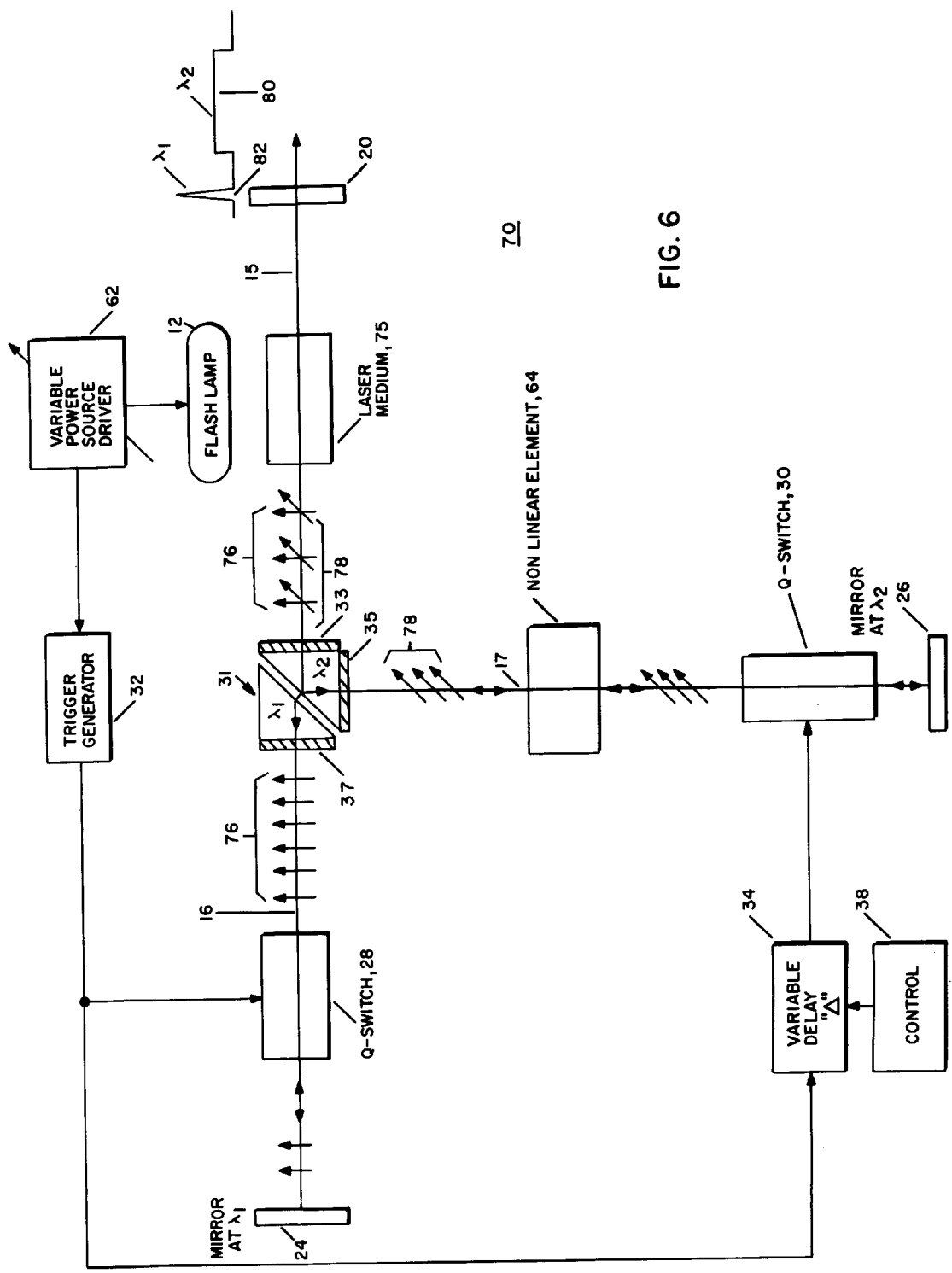
FIG. 6 is a block diagram illustrating a multiple pulse laser system in which both pulse spacing and pulse width are controlled, also indicating the utilization of a polarizing element for more complete color separation in the system.

Referring now to FIG. 6, a laser system 70 is illustrated in which color difference is accomplished by polarizing beam splitter 31 with anti-reflective coatings 31, 33 and 35 as described in connection with FIG. 3. In this system a laser medium 75 is provided which produces radiation at two wavelengths in accordance with the transitions of FIG. 2b.

In addition to the production of laser radiation at two wavelengths, it is a property of the radiation produced by the host material that radiation of one color is polarized in one direction, generally indicated by arrows 76, while radiation of the other wavelength is polarized in an orthogonal direction as illustrated by arrows 78. The other elements of the laser system illustrated in FIG. 6 are similar to those in FIGS. 3 and 4 with like elements being assigned like reference characters. In this embodiment, the non-linear element 64 of FIG. 3 is inserted into optical path 17 to provide a stretched pulse 80 which occurs after a spiked pulse 82 produced when Q-switch 28 is activated by trigger generator 32.

The pulse width of pulse 80 is controlled by the variable driver power source 62, since the nonlinear element 64 is positioned in the cavity tuned to the $\lambda_1$ transition of the host material. The variable power source may be made to vary the power to the flash lamp in accordance with any intelligence to be transmitted.

In operation, upon optical pumping the laser host material lases producing an output at $\lambda_1$ and $\lambda_2$ with the $\lambda_1$ output being polarized for instance in a vertical direction, and the $\lambda_2$ output being polarized orthogonally as illustrated in a horizontal direction. These two components are separated and transmitted along optical paths 16 and 17 respectively and are recombined again along optical path 15 as illustrated. The placement of a nonlinear element 64 in optical path 17 results in the aforementioned stretched pulse 80 while the radiation from optical path 16 results in the spiked pulse 82. Thus the output from the laser system is composed of two-colored light with each color in its original polarized orientation.

Figure 7:
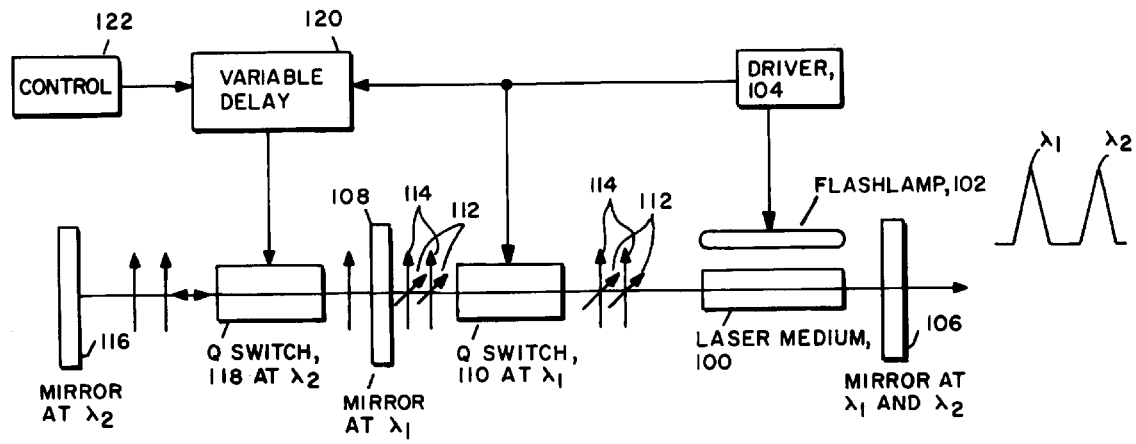
FIGS. 7 and 8 illustrate an in-line embodiment of the subject invention.
Figure 8:
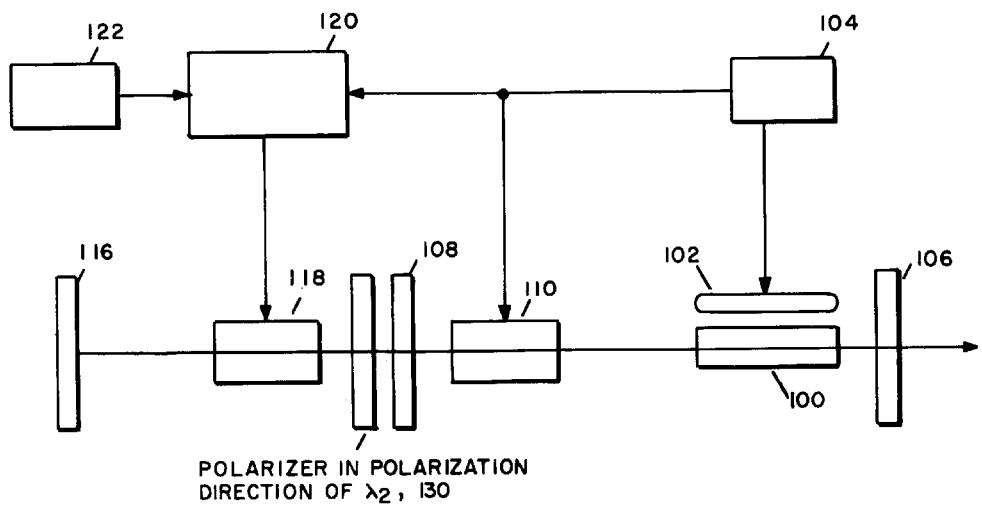

In a still further embodiment an in-line multicolor, multipulse laser is illustrated in FIGS. 7 and 8. Referring to FIG. 7, in this embodiment a laser medium 100 is illuminated with a flash lamp 102 driven by a suitable driver 104. This laser medium is located in a cavity tuned to the $\lambda_1$ transition of the laser which is defined by a partially reflecting mirror 106 at wavelengths $\lambda_1$ and $\lambda_2$ and a mirror 108 which is reflective at $\lambda_1$. A first Q-switch 110 is located between mirror 108 and laser medium 100 and is operated by driver 104 in accordance with the optical pumping of the laser medium. In one embodiment this Q-switch only gates $\lambda_1$ radiation because of the unique polarization of this wavelength due to the aforementioned birefringent effect. A Pockel's cell is such a Q-switch. Thus, in a preferred embodiment this Q-switch is a Pockel's cell polarized in the direction of the polarization of the $\lambda_1$ output from the laser medium. It will be appreciated that this type of Q-switch has very little, if any, effect on the $\lambda_2$ radiation from the laser medium. Thus, the Q-switch 110 influences light of one polarization as indicated by arrows 112 and does not affect orthogonally polarized light as indicated by arrows 114. In this embodiment, $\lambda_1$ is chosen to be shorter than $\lambda_2$.

The second laser cavity for the $\lambda_2$ wavelength of the laser is defined by mirror 106 and a mirror 116 reflective at the $\lambda_2$ wavelength of the laser, with a second Q-switch 118 interposed between mirror 116 and mirror 108. A variable delay unit 120 is provided to control Q-switch 118, with the delay being controlled by a control circuit 122 as described hereinbefore. It will be appreciated that mirror 108, while being substantially reflective at $\lambda_1$, is substantially transmissive at $\lambda_2$. Thus, Q-switch 110 and mirror 108 permit the in-line configuration by effectively being nonresponsive to the $\lambda_2$ wavelength.

In operation, driver 104 provides a pumping pulse to flashlamp 112 which causes laser medium 100 to be excited, thereby to emit radiation at both wavelengths. Responsive to the pumping of the laser medium Q-switch 110 is actuated to gate $\lambda_1$ wavelength light to mirror 108 and then to block $\lambda_1$ radiation in the cavity tuned to $\lambda_1$ such that a first pulse having one polarization and one color, $\lambda_1$, is coupled out of the system through mirror 106. Thereafter, variable delay unit 120 actuates Q-switch 118 such that light at the $\lambda_2$ wavelength is gated to mirror 116 and then blocked. This produces a second pulse having a different polarization and color, $\lambda_2$, which is coupled out of the system through mirror 106. During this second Q-switching operation, Q-switch 110 and mirror 108 are effectively removed from the system and the effective cavity length is the distance between mirrors 106 and 116. Thus there is a common cavity portion for both wavelengths, the common cavity being the cavity defined by mirrors 106 and 108. Alternatively, Q-switch 110 may be gated on again with the gating on of Q-switch 118 such that any residual effect of Q-switch 110 on the $\lambda_2$ wavelength pulse is eliminated. This permits Q-switch 110 to be any of a variety of Q-switches.

Referring now to FIG. 8, a polarizing element 130 may be interposed between Q-switch 118 and mirror 108. This element is polarized in a direction to reject the $\lambda_1$ wavelength radiation while transmitting the $\lambda_2$ wavelength radiation to provide an added measure of isolation between the $\lambda_2$ and $\lambda_1$ wavelengths.

What has therefore been accomplished is the provision of a laser system which by virtue of its multicolor, multicavity configuration is able to produce multiple pulses with a high degree of control of both pulse spacing and pulse width. The number of pulses per individual flash lamp pulse is limited only by the number of wavelengths at which the laser host material lases and the number of cavities which are provided. Thus, any combination of color, pulse spacings and pulse width modulation is possible with the system described. Moreover, because of the discovery that the light produced with a two color laser is polarized and orthogonally oriented, multiple pulses can be produced from lasers having the FIG. 2b transition configuration when rapid Q-switching is not available. Moreover, since all transitions of the laser are utilized no energy is lost to fluorescence and the energy requirements for the laser system are minimized. The versatility of the subject system is manifest in the type of control over the output of the laser and the unique ease with which the pulse parameters can be varied.

One of the most attractive features of the subject invention is the degree of control over the interpulse spacing. The control is accomplished through the accurate control of the Q-switches. Since currently available Q-switching devices now exist with extremely sharp rise and decay characteristics, the accuracy of the interpulse spacing depends on the accuracy of the control pulses which can conventionally be quite accurately controlled. Thus, interpulse jitter can be held low.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:
1. A method for designating a target comprising:
   illuminating a target with multiple laser pulses (of) of differing colors, said pulses having spacings between pulses unique to a known illuminating means and variable down to a predetermined small spacing, and elongating one of said pulses, whereby pulses reflected by said target having said unique pulse spacings designate the target as the one illuminated by said known illuminating means and whereby said pulse spacings may be made small enough such that the multiple pulse nature is difficult to detect for those not initially aware of the multiple pulse nature of the illumination.

2. A method for designating a target comprising:

providing a source of multiple differently colored pulses of electromagnetic radiation from a single rod multiple cavity laser having sequentially actuated Q-switches one each to a cavity such that the inter-pulse spacing is of a predetermined small spacing;

illuminating a target with said multiple differently colored pulses, said pulses having pulse spacings unique to a known illuminating source set by said sequential actuation; and detecting electromagnetic radiation having said unique pulse spacings from a reflective object, whereby said object is designated as the one illuminated by said known illuminating source, and whereby said pulse spacings is small enough such that the multiple pulse nature is difficult to detect for those not initially aware of the multiple pulse nature of the illumination.

3. A system for designating a target, comprising:

means for illuminating a target with multiple differently colored pulses of electromagnetic radiation, said means including a single rod, multiple cavity laser having sequentially actuated Q-switches, one each to a cavity, said pulses having unique pulse spacings set by said sequential actuation; and means for detecting electromagnetic radiation from said target having said unique pulse spacings.

4. A method for designating a target comprising the steps of:

illuminating a target with multiple laser pulses of differing colors from a single rod, multiple cavity laser source, said pulses having pulse spacings and colors unique to said source; and detecting electromagnetic radiation from said target having said unique pulse spacings and colors, thereby providing countermeasure resistance in terms of the difficulty of detecting and duplicating said colors and spacings.

5. The method of claim 4 and further including the step of providing that the interpulse spacings are small enough such that the multiple pulse nature is difficult to detect for those not initially aware of the multi-pulse nature of the illumination.

6. A method of designating a target comprising:

illuminating a target with multiple laser pulses of different colors, said pulses having pulse spacings unique to a known illuminating means and selectably variable down to a predetermined small spacing by virtue of the use of differing colors, whereby the small pulse spacings, the variability of the pulse spacings, and the use of two colors makes detection of the multiple pulse nature of the illumination difficult to detect by the target and duplication of the exact interpulse spacing by the target difficult.

7. A method for designating a target comprising illuminating a target from a single rod, multiple cavity laser with multiple laser pulses of differing colors, said pulses having pulse spacings unique to an illuminating means, whereby electromagnetic radiation reflected by said target having said unique pulse spacings designates the target as the one illuminated by said illuminating means.

* * * * *